Figure 1:
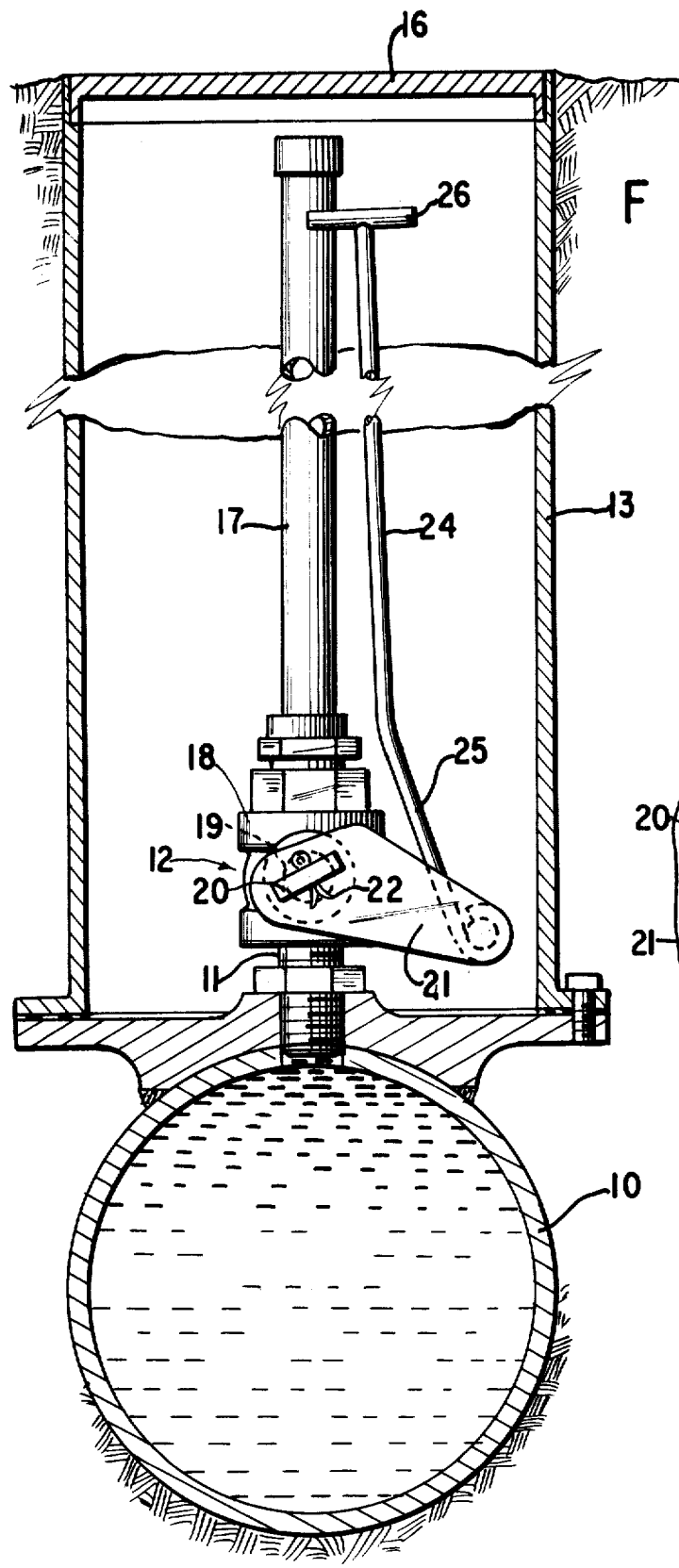

United States Patent
Wedge

[15] 3,675,675
[45] July 11, 1972

[54] BALL VALVE WITH ARM OPERATOR

[72] Inventor: William W. Wedge, Fairfield, Conn.
[73] Assignee: Wedge, Incorporated, Bridgeport, Conn.
[22] Filed: July 8, 1970
[21] Appl. No.: 53,158

[52] U.S. Cl. ........................................................137/368
[51] Int. Cl. ..............................................F16l 5/00
[58] Field of Search ....................................137/364–373; 251/294

[56] References Cited

UNITED STATES PATENTS

| 1,281,848 | 10/1918 | Saxlund | 137/368 |
| 1,529,900 | 3/1925 | Mayer | 251/294 |
| 1,741,320 | 12/1929 | Lee et al. | 251/294 X |
| 2,893,419 | 7/1959 | Coulter | 251/294 X |

FOREIGN PATENTS OR APPLICATIONS 681,502  9/1939  Germany..........................137/364

Primary Examiner—Henry T. Klinksiek
Attorney—Smythe & Moore

[57] ABSTRACT

A ball valve mounted on an underground water main has a pivotable operating shaft extending laterally outwardly thereof and an arm is mounted on the outer end of the shaft. A substantially vertically positioned rod extends upwardly toward the surface of the ground and has its lower end bent outwardly at angle of about 30° from the vertical. This bent end is pivotally connected to the end of the arm which is disposed at a slight angle below the horizontal when the valve is closed. Pulling of the rod upwardly will open the valve and pushing the rod downwardly will close the valve.

3 Claims, 2 Drawing Figures

PATENTED JUL 11 1972 3,675,675

INVENTOR
WILLIAM W. WEDGE
BY
Smythe & Moore
ATTORNEYS

BALL VALVE WITH ARM OPERATOR

In order to supply water between different locations in communities, industrial installations and the like, underground pipes or mains are provided through which the water is flowed. In order to permit access to the mains at various locations thereof, valves are generally mounted on the main. Access may be desired to test the flow of water within the main to ascertain the rate of flow and to determine whether or not new mains are required. Since the valves are generally located several feet below the surface of the ground, they are generally surrounded by an enclosure or access box. This eliminates the necessity of excavating the earth whenever it is desired to operate such a valve. While the access box permits an operator to manipulate the valve from the surface of the ground, it is then necessary to have a satisfactory valve actuating arrangement. Such an actuating arrangement must be readily accessible to the operator on the surface of the ground but must permit the operator to accurately control the opening and closing of the underground valve. Ball valves have been generally used in such installations and various arrangements have been proposed for operating such ball valves. However, such arrangements have the disadvantage of not being able to exert maximum actuating force on the ball valve when it is required. It has, accordingly, been difficult for an operator to initially open the valve and to control the opening of the valve to the desired degree. Further, such known valve operators have been generally unsatisfactory in that they are complicated in construction and expensive to install and to maintain. The expense of installation and maintenance is an important consideration since it is generally necessary to provide a complete actuator apparatus for each valve mounted on a main.

One of the objects of the present invention is to provide an improved actuator for an underground ball valve mounted on a water main.

Another of the objects of the present invention is to provide an actuator device for an underground ball valve which will exert maximum actuating force at the time that the maximum resistance to actuating the valve is encountered.

Another of the objects of the present invention is to provide an actuator for underground ball valves which is simple and inexpensive in construction and reliable in operation.

According to one aspect of the present invention, there is provided an actuating device for an underground ball valve which is mounted on an underground water main. A pivotable operating shaft extends laterally outwardly of the ball valve in substantially a horizontal plane so that pivoting of the shaft will open and close the vale. An arm is mounted on the outer end of the operating shaft and is disposed at a slight angle below the horizontal when the valve is closed. A substantially vertically extending operating rod has its lower end bent outwardly toward the end of the arm and is pivotally connected thereto. The operating rod extends upwardly toward the surface of the ground so as to be accessible to an operator who can manipulate the rod to open and close the valve.

An access box may be provided to surround the valve and extends upwardly toward the surface of the ground. The operating rod will extend upwardly within the access box.

Other objects, advantages and features of the present invention will become apparent from the accompanying description and drawings, which are merely exemplary.

IN THE DRAWINGS

Figure 2:
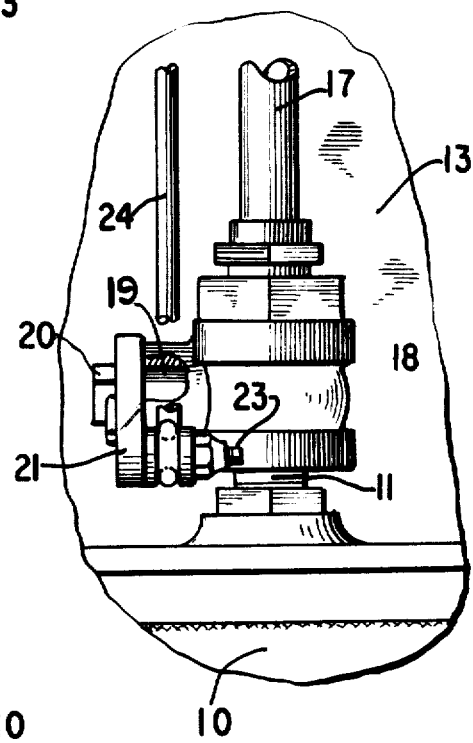

FIG. 1 is a vertical sectional view of an access box having therein an actuator connected to a ball valve mounted on an underground main in accordance with the present invention; and FIG. 2 is a side elevational of the ball valve and actuating linkage shown in FIG. 1.

Proceeding next to the drawings wherein like reference symbols indicate the same parts throughout the various views, a specific embodiment of the present invention will be described in detail.

In FIGS. 1 and 2 there is indicated at 10 an underground water main or conduit which, by way of example, may range from 6–48 inches in diameter. A nipple 11 is tapped into the upper portion of the main and a ball valve 12 connected at its upper end. Surrounding the ball valve 12 is an access or valve box 13, which may be in one or a plurality of sections and which extends upwardly from the main 10 to the surface of the ground indicated at 14. The upper end of the access box is provided with an annular seat 15 upon which is positioned a removable cover 16. A riser 17 may extend upwardly from the ball valve 12 to a position in the upper region of the access box. The riser 17 may be used to withdraw water or to test or measure the flow of water in the main 10.

The ball valve 12 has a valve body 18 and an operating shaft 19 extends laterally outwardly of the valve body in substantially a horizontal plane. The outer end of the operating shaft may be provided with an enlarged portion having a substantially rectangular cross section as indicated at 20. Pivoting of the operating shaft will remove or replace the ball in its seat in a manner known in the art.

On the rectangular end 20 of the operating lever is mounted an arm 21 and retained thereon by means of a cotter pin 22 or some other similar fastening arrangement. The end of the arm 21 is provided with a pin or bolt 23 to which is pivotally connected an upwardly extending operating rod 24 at its lower end 25 which is bent outwardly from the vertical at an angle of approximately 30°. The operating rod 24 entends vertically upwardly within the access box 13 so that the major portion of this rod is substantially perpendicular to the main 10. The upper end of the operating rod terminates in the vicinity of the upper portion of the access box 13 and may be provided with a handle 26 to facilitate manipulation thereof by an operator located on the surface of the ground.

The arm 21 is disposed at a slight angle below the horizontal, as may be seen in FIG. 1, when the ball valve is in the closed position. To open the valve the operator must pull the operating rod 24 upwardly. In view of the linkage arrangement between the operating shaft and the ball valve and the operating rod, a maximum actuating force will be exerted on the operating shaft when the greatest resistance is encountered in opening the valve so as to remove the ball from its seat. A characteristic of ball valves is that the greatest actuating force is required to move the ball during the initial portion of its opening movement. The combination of the vertically extending operating rod having a bent lower portion pivotally connected to an arm mounted on an end of the operating shaft provides a mechanical advantage which permits the maximum actuating force to be applied to moving the ball during this opening movement of the valve.

In a similar manner, the ball valve is closed merely by exerting downward force on the operating rod 24 to pivot the operating shaft into the closed position whereby the ball is returned to its seat.

Thus it can be seen that the present invention discloses a simple and effective actuating mechanism for operating an underground ball valve. The actuating mechanism is not only simple in structure but facilitates the opening of a ball valve by permitting the maximum force to be exerted in initially removing the ball from its seat from within the valve.

It will be understood that various s details of construction and arrangement of parts may be made without departing from the spirit of the invention except as defined in the appended claims.

What is claimed is:

1. In an actuating device for an underground valve mounted on a horizontally extending water main, an access box extending from the surface of the ground to said main, a nipple tapped into said main, a ball valve mounted on said nipple in said access box, a riser connected to said ball valve and extending upwardly through said access box to a point adjacent the surface, a pivotable operating shaft extending laterally outwardly of said valve in a substantially horizontal plane so that pivoting of the shaft will open and close the ball valve, an arm mounted on one end of said operating shaft and disposed at a slight angle below the horizontal when the valve is closed, a substantially vertically extending stiff operating rod with a major portion of said rod being substantially perpendicular to said water main and pivotally connected to said arm, said rod extending upwardly toward the surface of the ground so that manipulation of the rod within said access box will open and close said valve.

2. An actuating device as claimed in claim 1 wherein said riser and nipple are in substantially straight line relation.

3. An actuating device as claimed in claim 1 wherein the lower end of said rod has its lower end bent outwardly toward the end of said arm at an angle of about 30° from the vertical.

* * * * *